United States Patent [19]

Frielich et al.

[11] Patent Number: 6,086,927
[45] Date of Patent: Jul. 11, 2000

[54] PROCESS FOR PREPARING CALCIUM ENRICHED FOOD PRODUCTS AND THE PRODUCTS THEREFROM

[75] Inventors: Sean H. Frielich, Auburndale; Catherine Danek Stephens, Clermont, both of Fla.

[73] Assignee: Pasco Beverage Co., Dade City, Fla.

[21] Appl. No.: 09/129,788

[22] Filed: Aug. 6, 1998

[51] Int. Cl.$^7$ ........................................ A23L 1/30
[52] U.S. Cl. ........................ 426/74; 426/599; 426/615; 426/616
[58] Field of Search ................................ 426/74, 599, 615, 426/616

[56] References Cited

U.S. PATENT DOCUMENTS

| | | |
|---|---|---|
| 2,325,360 | 7/1943 | Ayers et al. . |
| 2,548,594 | 4/1951 | Edmonds . |
| 2,567,038 | 9/1951 | Stevens . |
| 2,845,355 | 7/1958 | McColloch et al. . |
| 3,030,213 | 4/1962 | Tidridge et al. . |
| 3,114,641 | 12/1963 | Sperij et al. . |
| 3,227,562 | 1/1966 | Houghtaling et al. . |
| 3,395,021 | 7/1968 | Glicksman et al. . |
| 3,657,424 | 4/1972 | Aktins et al. . |
| 3,949,098 | 4/1976 | Bangert . |
| 3,988,487 | 10/1976 | Sanderson et al. . |
| 4,031,257 | 6/1977 | Wilson et al. . |
| 4,042,601 | 8/1977 | Wilson et al. . |
| 4,070,491 | 1/1978 | Vinals et al. . |
| 4,071,034 | 1/1978 | Vinals et al. . |
| 4,071,535 | 1/1978 | Vinals et al. . |
| 4,081,479 | 3/1978 | Hall et al. . |
| 4,102,928 | 7/1978 | Hall et al. . |
| 4,115,406 | 9/1978 | Vinals et al. . |
| 4,175,569 | 11/1979 | Hall et al. . |
| 4,296,137 | 10/1981 | Boden . |
| 4,296,138 | 10/1981 | Boden . |
| 4,330,417 | 5/1982 | Boden . |
| 4,333,481 | 6/1982 | Boden . |
| 4,339,341 | 7/1982 | Boden . |
| 4,341,646 | 7/1982 | Boden . |
| 4,347,857 | 9/1982 | Boden . |
| 4,348,416 | 9/1982 | Boden . |
| 4,351,735 | 9/1982 | Buddemeyer et al. . |
| 4,354,953 | 10/1982 | Boden . |
| 4,357,315 | 11/1982 | Boden . |
| 4,357,316 | 11/1982 | Boden . |
| 4,387,036 | 6/1983 | Boden . |
| 4,551,342 | 11/1985 | Nakel et al. . |
| 4,622,227 | 11/1986 | Saleeb et al. . |
| 4,722,847 | 2/1988 | Heckert . |
| 4,737,375 | 4/1988 | Nakel et al. . |
| 4,740,380 | 4/1988 | Melachouris et al. . |
| 4,871,554 | 10/1989 | Kalala et al. . |
| 4,919,963 | 4/1990 | Heckert . |
| 4,986,994 | 1/1991 | Buccus, Jr. . |
| 5,028,446 | 7/1991 | Saleeb et al. . |
| 5,149,552 | 9/1992 | Vidal et al. . |
| 5,296,246 | 3/1994 | Inoue et al. . |
| 5,389,387 | 2/1995 | Zuniga et al. . |
| 5,424,082 | 6/1995 | Dake et al. . |
| 5,468,506 | 11/1995 | Andon . |
| 5,474,793 | 12/1995 | Meyer et al. . |
| 5,500,232 | 3/1996 | Keating . |
| 5,851,578 | 12/1998 | Gandhi ...................................... 426/74 |
| 5,891,497 | 4/1999 | Bartasis ...................................... 426/74 |

FOREIGN PATENT DOCUMENTS 54-8767   1/1979   Japan .

Primary Examiner—Helen Pratt
Attorney, Agent, or Firm—Burns, Doane, Swecker & Mathis, L.L.P.

[57] ABSTRACT

A process for preparing a calcium enriched food product by:

A) forming a mixture of calcium hydroxide and water or a fruit juice;

B) mixing phosphorus-based acid with the mixture, the phosphorus-based acid being in an amount sufficient to substantially neutralize the calcium hydroxide or to obtain a pH in the range of from about 4.0 to about 6.0;

C) mixing calcium lactate with the mixture from step B) until the calcium lactate is dispersed into the mixture; and D) mixing calcium phosphate with the mixture from step C) until the calcium phosphate is dispersed into the mixture. Beverage material, especially fruit juice is mixed with the mixture from step D) so as to form a calcium enriched food product. A process is further provided wherein the components are directly added into fruit juice, particularly not from concentrate fruit juice. Calcium enriched orange juice made by the process can exhibit taste and color characteristics similar to non-calcium enriched orange juice.

41 Claims, No Drawings

PROCESS FOR PREPARING CALCIUM ENRICHED FOOD PRODUCTS AND THE PRODUCTS THEREFROM

BACKGROUND OF THE INVENTION

A. Field of the Invention

The present invention relates to a process for preparing calcium enriched food products, particularly beverages, and the products that can be prepared by the process.

B. Description of the Related Art

Calcium is essential to the well being of humans and is continuously utilized by the body. In particular, calcium is used in the body to provide rigidity to the skeletal framework, as a catalyst for the conversion of prothrombin to thrombin, a compound necessary for blood clotting, to increase cell membrane permeability, to activate a number of enzymes including lipase and adenosine triphosphatase, and to act as a component in the mechanisms of neural transmission and muscular contraction.

Calcium can be obtained from a variety of dietary sources. Primary sources of calcium are dairy products, in particular milk, which account for 75% of the daily calcium intake while foods other than dairy products generally contribute less than 200 mg of calcium daily. However, beginning in young adulthood and continuing through later life, the general population may not consume milk in sufficient quantities to obtain the recommended dietary levels of calcium.

Calcium deficiencies have been noted as a major health problem, particularly for women. Osteoporosis, an accelerated bone loss, can occur when the body is deficient in calcium. During a period of calcium deficiency, calcium that is needed for various body functions can be retrieved from bones and thereby prevent bone remodeling. Premenopausal adult women require about 1,000 milligrams of calcium per day (based on recommendations by the 1984 NIH Consensus Development Panel on Osteoporosis). Younger women, particularly pregnant and lactating women and post-menstrual women may require more. Further, adequate calcium intake before age 35 may lessen the effect of osteoporosis in later life.

To provide additional sources of calcium, a variety of calcium supplements have been developed. Calcium carbonate, calcium lactate, and calcium gluconate are commonly used. Calcium carbonate has 40 percent calcium and is generally available in tablet form. Calcium lactate has 13 percent calcium and calcium gluconate has 9 percent calcium. The problems encountered with tablets are that they may be difficult to swallow, or if chewable, can leave an unpleasant "chalky" taste in the mouth.

To meet this situation, the art has developed a number of calcium enriched beverages. Such beverages have ranged from enriched milk products to a sweetener supplement containing soluble calcium, citric acid, malic acid and sugar, as described in U.S. Pat. No. 5,468,506. Fruit juices have received particular attention as a vehicle for providing additional calcium to the diet. For instance, U.S. Pat. No. 4,722,847 describes fruit juice beverages and concentrates by forming a premix solution containing highly soluble calcium citrate and malate species which is then combined with concentrated fruit juice, plus other fruit juice materials. The method is said to provide beverages and concentrates which contain substantial levels of solubilized calcium without generating cooked/browned off-flavors and without including undesirable species such as chloride ions.

U.S. Pat. No. 4,871,554 describes a calcium fortified beverage that contains water, a concentrated fruit juice and a solubilized calcium component derived from a salt blend wherein 50–80% by weight of total calcium is tribasic calcium phosphate and 20–50% by weight of total calcium is calcium lactate. A number of other documents describing calcium enriched beverages is described in the background of the foregoing patents.

The large number of documents describing calcium enriched beverages reflects the difficulty in providing an acceptable product. Calcium compounds can be difficult to dissolve into fruit juice beverages unless expensive mixing equipment is used and can impart undesirable color and/or unpleasant taste to the beverage. Furthermore, certain of the calcium compounds used to enrich the beverages are relatively expensive and significantly increase the cost of the calcium enriched product.

SUMMARY OF THE INVENTION

In one aspect, the present invention provides a process for preparing a calcium enriched food product comprising:

A) forming a mixture of calcium hydroxide and water;

B) mixing a phosphorus-based acid with the mixture, said phosphorus-based acid being in an amount sufficient to substantially neutralize the calcium hydroxide;

C) mixing calcium lactate with the mixture from step B) until the calcium lactate is dispersed into the mixture;

D) mixing calcium phosphate with the mixture from step C) until the calcium phosphate is dispersed into the mixture; and E) mixing the mixture from step D) with fruit juice so as to form a calcium enriched food product.

In a further aspect, the present invention provides a process for preparing a calcium enriched food product comprising:

A) forming a mixture of calcium hydroxide and fruit juice;

B) mixing a phosphorus-based acid with the mixture, said phosphorus-based acid being in an amount sufficient to substantially neutralize the calcium hydroxide;

C) mixing calcium lactate with the mixture from step B) until the calcium lactate is dispersed into the mixture; and D) mixing calcium phosphate with the mixture from step C) until the calcium phosphate is dispersed into the mixture so as to form a calcium enriched food product.

The present invention also provides a calcium enriched food product that is made by the processes.

DESCRIPTION OF THE PREFERRED EMBODIMENTS

As noted above, one aspect of the present invention relates to a process for preparing a calcium enriched food product wherein a mixture of calcium hydroxide and water is first formed. The calcium hydroxide is of food grade purity (FCC certified (compliant)), is generally at least about 95% by weight, preferably from about 96.5 to about 98% by weight pure, and is typically in the form of powder having a particle size such that about 96.5% by weight passes through a 325 mesh sieve. The calcium hydroxide is available from a number of sources, such as Mississippi Lime Management Company distributed by Bell Chem. Corp. of Longwood, Fla., under the designation hydrated lime.

To form the calcium hydroxide and water mixture, the calcium hydroxide is added to water in a first container. As can be understood by those knowledgeable in the art, the calcium hydroxide can be added as calcium oxide which converts to calcium hydroxide in the presence of water. The container is typically in the form of a stainless steel kettle provided with an agitator. The size of the kettle is preferably selected so as to provide a sufficient volume depending on the size of the batch. For instance, if a 1,000–2,000 gallon batch of final product is to be prepared, the volume of the first container can be about 250 gallons.

The calcium hydroxide is added in an amount that depends on the final product and the level of calcium fortification. For instance, for the production of typical concentrated fruit juices (e.g., orange juice) that are four-fold concentrated (which are reconstituted by combining three volumes of water with one volume of concentrate) and are designed to provide 30% of the recommended daily intake (RDI) for calcium per 8 fl. oz. serving, calcium hydroxide is added to form from about 2.6 to about 3.6% weight to volume of the mixture, preferably from about 3.1 to about 3.3% weight to volume of the mixture. Of course, concentrations outside of these ranges can be used if it is convenient to handle larger volumes of the mixture or a single strength product is to be prepared where substantially all of the water used to reconstitute the concentrate is derived from the calcium-containing mixture. During mixing of the calcium hydroxide in the kettle, as well as subsequent mixing steps, the temperature of the contents of the kettle is from about 25 to about 35° C. Mixing of the calcium hydroxide is conducted for a time suitable to completely disperse the calcium hydroxide in the water. This usually involves mixing for from about 5 to about 15 minutes, but is dependent on the mixing equipment utilized.

To the calcium hydroxide and water mixture is added a phosphorus-based acid in an amount sufficient to substantially neutralize the calcium hydroxide. The phosphorus-based acid can be phosphorous acid, ortho-phosphoric acid (commonly referred to as phosphoric acid), meta-phosphoric acid, polyphosphoric acid, pyrophosphoric acid or material which can provide such acids, such as phosphoric anhydride. Mixtures of the phosphorus-based acid may also be used. The selected phosphorus-based acid must be food grade. The preferred phosphorus-based acid is phosphoric acid, particularly phosphoric acid that has a purity of at least about 85%, preferably from about 84.5% to about 85.5% by weight. Phosphorus-based acids are commercially available and an especially suitable phosphoric acid is commercially available from Wilson Co. of Aurora, N.C. distributed by Bell Chem. Corp. of Longwood, Fla., under the designation Albrite 85% Phosphoric Acid Food Grade. The phosphorus-based acid is typically added to the mixture of calcium hydroxide and water in the form of an aqueous solution at a concentration that is again selected depending on the final product and the desired % RDI for calcium per serving. For a typical four-fold concentrated fruit juice, the concentration of phosphorus-based acid in the aqueous solution is from about 3.1 to about 4.3% weight to volume, especially when the phosphorus-based acid is phosphoric acid (which again can vary outside of this range) and is mixed in the first container so as to obtain a mixture having a pH of from about 6 to about 7, preferably about 6.8. Mixing of the phosphorus-based acid with the calcium hydroxide is typically conducted for from about 8 to about 15 minutes, optimally about 12 minutes.

Although it is preferred from the standpoints of the flavor of the final product and the balance of natural fruit acids that the phosphorus-based acid be exclusively used to neutralize the calcium hydroxide, a portion of the phosphorus-based acid (generally less than about 25% by weight of the total acid) can be replaced with a food grade mineral acid (e.g., sulfuric acid) to obtain a pH within the aforementioned range of from about 6 to about 7.

Food grade calcium lactate is next added to the first container and mixing is conducted so that the calcium lactate is thoroughly dispersed. The calcium lactate is added in the form of granules or preferably powder from the standpoint of ease of dispersion and mixing is conducted for from about 3 to about 7 minutes so that thorough dispersion is achieved. The calcium lactate is preferably in hydrated form and is commercially available from Purac Biochemical of Holland distributed by Bell Chem. Corp. of Longwood, Fla., under the designation Puracal PP. The amount of calcium lactate added to the mixture is again selected depending on the final product and the desired % RDI for calcium per serving, but a four-fold concentrated fruit juice that provides 30% RDI for calcium per 8 fl. oz. serving, the calcium lactate is added to the first container in an amount such that the concentration is from about 4.0 to about 5.6% weight to volume (which can again vary outside of this range depending on factors such as amount of mixture which is desired and the type of final product). Although not preferred, a small portion of the calcium lactate (e.g., less than about 20% by weight of the calcium lactate) can be replaced with calcium sulfate. However, the amount of calcium sulfate should be selected so as to not substantially adversely affect the flavor of the final product.

Food grade calcium phosphate is then added to the first container and mixing is conducted so that the calcium phosphate is thoroughly dispersed. The calcium phosphate can be mono-calcium phosphate, di-calcium phosphate, tri-calcium phosphate or mixtures thereof. Tri-calcium phosphate is preferred in view of the flavor of the final product. The calcium phosphate is generally added in the form of powder and mixing is conducted for from about 8 to about 12 minutes so that thorough dispersion is achieved. The calcium phosphate is commercially available from various sources. For instance, tri-calcium phosphate is commercially available from Gadot Biochemical of Israel distributed by Bell Chem. Corp. of Longwood, Fla. under the designation Tri Calcium Phosphate FCC and has a particle size such that a minimum of 95% by weight passes through a 325 mesh sieve.

Upon completion of the addition and mixing of the calcium phosphate, the mixture comprises from about 34 to about 48% by weight of total calcium derived from calcium hydroxide, from about 12 to about 18% by weight of total calcium derived from calcium lactate and from about 40 to about 48% by weight of total calcium derived from calcium phosphate. Preferably, the mixture comprises from about 37 to about 43% by weight of total calcium derived from calcium hydroxide, from about 14 to about 16% by weight of total calcium derived from calcium lactate and from about 43 to about 47% by weight of total calcium derived from calcium phosphate. In an especially preferred embodiment, the mixture comprises about 40% by weight of total calcium derived from calcium hydroxide, about 15% by weight of total calcium derived from calcium lactate and about 45% by weight of total calcium derived from calcium phosphate.

Upon completion of the calcium phosphate mixing step, the contents of the first container are added to a beverage material that can be naturally or artificially flavored and/or sweetened that is maintained in a separate second container. A preferred beverage material is fruit juice. While any fruit juice can be used, especially advantageous are citrus fruit juices, particularly orange juice and/or grapefruit juice. The fruit juice can be in concentrated form such as 30 to 65 brix as measured by a refractometer in which values have been corrected for acidity. Concentration of the fruit juices can be conducted in any technique known to those of ordinary skill in the art, such as a falling film evaporator. An especially preferred concentrate is concentrated orange juice for manufacturing as defined in 21 C.F.R. §146.153 (the contents of title 21 of the Code of Federal Regulations being incorporated by reference). Thus, for instance, the concentrated orange juice for manufacturing can be thawed frozen orange juice which has been five-fold concentrated so that when the calcium-containing mixture is added to the concentrate (with or without subsequently added rinse water), a four-fold concentrate is obtained which can be packaged, frozen and ultimately sold and which can be reconstituted by combining three volumes of water with one volume of concentrate.

The second container is generally a stainless steel tank having a volume that is dependent on the desired batch size. The tank is provided with an agitator and can be maintained at a temperature of from about 2 to about 10° C. The calcium-containing mixture is mixed with the fruit juice for from about 10 to about 15 minutes so that complete dispersion is achieved. If desired, juice oil and essences, such as orange oil and essences or grapefruit oil and essences can be added to the second container to improve the characteristics of the final product before or after the addition of the calcium-containing mixture.

In order to ensure that all of the calcium-containing mixture is transferred from the first container to the second container holding the fruit juice, rinse water is usually sprayed into the first container and the rinse water is then added to the fruit juice mixture in the second container and mixed therewith. Typically, the amount of water added to the first container is from about 30 to about 50% of the volume of the contents of the first container. The calcium concentration of the mixture can then be determined. If additional calcium is warranted, a thoroughly mixed water and calcium lactate mixture can be added. Additional water may be directly added to the second container so that a calcium enriched fruit juice beverage is formed. The calcium enriched fruit juice beverage can then be packaged for transportation and sale or can be transferred to a bulk tank for shipment and later packaging. Thus, for example, four-fold concentrated orange juice made by the foregoing process can be packed into containers and blast frozen to produce calcium enriched frozen concentrated orange juice that the end user will reconstitute with three containers of water to produce a calcium enriched single strength product that can provide 30% RDI for calcium per 8 fl. oz. serving. Alternatively, the calcium enriched concentrate can be reconstituted with water and packed into containers to provide a calcium enriched ready-to-serve product that can similarly provide 30% RDI for calcium per 8 fl. oz. serving.

In a further embodiment of the invention, a mixture of fruit juice and calcium hydroxide is initially formed by mixing calcium hydroxide (or calcium oxide which forms calcium hydroxide) with fruit juice rather than water. The fruit juice can be concentrated, such as a concentrate of from about 15 to about 40 brix, but is preferably not from concentrate. Especially preferred is not from concentrate orange juice or grapefruit juice. The process is conducted similar to the process described above with the phosphoric acid, calcium lactate and the calcium phosphate being sequentially added to the mixture of fruit juice and calcium hydroxide. However, upon completion of the phosphoric acid addition, the pH of the mixture can be approximately the pH of the original juice. Thus, for instance, where the fruit juice is orange juice, the pH upon completion of mixing of the phosphoric acid is from about 4.0 to about 5.0, especially about 4.2. On the other hand, where the fruit juice is grapefruit juice, the amount of phosphoric acid is reduce so that the pH in the container is from about 5.0 to about 6.0 so as to yield a more preferred product based on taste.

This embodiment of the invention can provide a high quality, fresh-tasting, not from concentrate juice which is calcium enriched without addition of water. To ensure that all the material is included and uniformly dispersed within the product, a first larger container can essentially be filled with the not from concentrate juice and a portion of the juice can be transferred to a smaller second container. The amount of juice transferred to the second container is selected so that the calcium hydroxide or calcium oxide, phosphoric acid, calcium lactate and calcium phosphate can be sufficiently dispersed in the juice to obtain the desired level of calcium for the entire volume of the first container when the juice in the second container is transferred back to the first container. Thus, for a first container holding 1600 gallons of not from concentrate juice, from about 150 to about 200 gallons can be transferred to a 250 gallon second container equipped with an agitator and the stated materials are added thereto in sufficient quantities such that when the juice is transferred back to the first container, the proper level of calcium enrichment can be attained.

After the juice is transferred back to the first container, the second container can then be rinsed with an additional quantity of juice from the first container (typically from about 30 to about 80% of the volume of the second container) to ensure that all the calcium derived from the described compounds is included within in the juice and to establish an essentially uniform concentration of calcium in the juice in the second container and the lines connecting the first and second containers.

As will be understood, other arrangement can also be used. For instance, the stated materials can be added to a selected quantity of juice in a large container and thereafter additional quantity of juice can be added to the container with mixing so that the materials are fully dispersed in the juice.

By following the teachings of the present invention, a calcium enriched food product can be prepared that is similar in characteristics to the product without calcium enrichment. For example, where calcium enriched orange juice is prepared by the present invention, the orange juice can have a calcium content of from about 1275 ppm to about 1700 ppm and yet have taste, color and aroma characteristics that are very similar to orange juice which has not been calcium enriched. Thus, for example, the calcium enriched juice can provide a substantial source of calcium (e.g., from about 10 to about 40% RDI for calcium per 8 fl. oz. serving) without a "chalky" taste that often accompanied known calcium enriched beverages. Furthermore, the product of the present invention can substantially maintain the calcium in dispersed form. These substantial advantages can be attained without specialized process equipment, such as high shear mixers, and without using more expensive sources of calcium such as calcium citrate or calcium gluconate or more expensive acids, such as citric acid.

The following Examples include lab scale protocols and illustrate various aspects of the present invention. In the Examples, the calcium hydroxide, phosphoric acid, calcium lactate and calcium triphosphate used are obtained from the sources identified above. It is to be understood that the present invention is defined by the appended claims and not the specific details of the Examples.

EXAMPLE 1

Into a 250 ml beaker was added 125 ml of deionized water. A stirring bar was added and the beaker was placed on a stirring plate so that stirring is continuously conducted. Calcium hydroxide in an amount of 4.01 gr was added to the beaker and stirring continued for 10 minutes. Phosphoric acid (85%) was next added to the beaker in an amount of 4.81 gr and stirring was continued for 15 minutes. The pH of the mixture was checked and, if necessary, additional acid was added to obtain a pH in the range of 6 to 7. Calcium lactate was then added to the beaker in an amount of 6.24 gr and stirring continued for 5 minutes. Tri-calcium phosphate was added to the beaker in an amount of 7.16 gr and stirring continued for 5 minutes.

In a separate container is placed 642.08 ml of an orange juice concentrate and pulp blend at 60 Brix which contains added cold press oil and essence. The mixture in the 250 ml beaker is added to the container holding the orange juice concentrate. The beaker is rinsed with 50 ml of deionized water and the rinse water is added to the container holding the orange juice concentrate and the contents are mixed well.

The calcium enriched orange juice was analyzed on the basis of Brix (percentage of soluble sugar solids) using a refractometer; Ratio (the relationship between Brix and acid content measured in % by weight as citric acid that is an indication of the maturity of the fruit); Color (measured by a citrus colorimeter as approved by the U.S. Dept. of Agriculture and the State of Florida); Oil (as determined by the Scott Oil Method described in the U.S. Dept. of Agriculture Handbook, the contents of which are incorporated by reference); COD (the Chemical Oxygen Demand which is a measure of amount of aromatic compounds); and Calcium (determined by the wet chemistry method using titration by ethylene diamine tetraacetic acid). The technique for determining the concentration of calcium is performed on samples of the juice concentrate before (blank) and after calcium addition and is as follows:

The juice sample is reconstituted to 12.2° Brix and 10 ml is pipetted into a centrifuge tube and 1 ml of 1N hydrochloric acid is added to the tube. The tube is centrifuged for 10 minutes at 1500 rpm. From the supernatant is pipetted 1 ml which is placed into an Erlenmeyer flask to which is further added 100 ml of distilled water. 2 ml of a 45% potassium hydroxide is pipetted with caution into the flask and one scoop of hydroxy naphthol blue indicator is then added. A stirrer bar is placed in the flask and the flask is placed on a stirrer plate in front of a white background and moderate stirring is conducted. Using a solution of 0.01M ethylene diamine tetraacetic acid (EDTA), the sample is titrated from a wine red to persistent (10 seconds) sharp blue end point. The amount of EDTA solution is recorded and the following calculation performed:

$$Ca^{++} (ppm) = \frac{(ml\ EDTA\ sample - ml\ EDTA\ blank) \times 0.4\ mg/ml\ Ca \times 1.1}{.001\ liters}$$

The foregoing characteristics were compared with those obtained from orange juice made from the same concentrate, but without calcium enrichment (the blank) and the results are provided in the following Table 1.

TABLE 1

| PRODUCT | BRIX | RATIO | COLOR | OIL | COD | Ca |
|---|---|---|---|---|---|---|
| Ca Enriched Orange Juice | 12.2 | 16.97 | 35.5 | 0.011% | 193 | 1355.6 ppm |
| Without Ca Enrichment | 11.9 | 18.27 | 35.3 | 0.009% | 190 | 211.2 ppm |

When orange juice made by this general process was subjected to a taste panel of 45 individuals, 16 individuals preferred the calcium enriched orange juice, 16 individuals preferred the orange juice without calcium enrichment and 13 individuals had no preference.

EXAMPLE 2

The process of Example 1 was repeated with a different source of frozen orange juice concentrate and the same analysis and comparison with the orange juice without calcium enrichment and the results are set forth in Table 2. The Table also includes the percentage of bottom pulp (BP) which is conducted in accordance with a U.S. Dept. of Agriculture test to determine the amount of insoluble material that does not float.

TABLE 2

| PRODUCT | BRIX | RATIO | COLOR | OIL | BP | COD | Ca |
|---|---|---|---|---|---|---|---|
| Ca Enriched Orange Juice | ~12.2 | 19.3 | 35.5 | 0.015% | 10% | 225 | 1298 ppm |
| Without Ca Enrichment | ~12.2 | 18.28 | 35.5 | 0.017% | 12% | 219 | — |

When orange juice made by this general process was subjected to a taste panel of 47 individuals, 20 individuals preferred the calcium enriched orange juice, 13 individuals preferred the orange juice without calcium enrichment and 14 individuals had no preference.

EXAMPLE 3

The process of Example 1 was repeated with thawed reconstituted frozen concentrate orange juice and the same analysis was conducted. A commercially available calcium enriched orange juice was then analyzed and the results are set forth in Table 3.

TABLE 3

| PRODUCT | BRIX | RATIO | COLOR | OIL | COD | Ca |
|---|---|---|---|---|---|---|
| Ca Enriched Orange Juice | 12.34 | 17.38 | 36.2 | 0.019% | 353 | 1355.2 ppm |
| Commercial Ca Enriched | 12.81 | 22.47 | 35.4 | 0.010% | — | 1113.2 ppm |

When orange juice made by this general process was subjected to a taste panel of 60 individuals, 23 individuals preferred the calcium enriched orange juice of the present invention, 22 individuals preferred the commercially available calcium enriched orange juice and 15 individuals had no preference.

EXAMPLE 4

The process of Example 1 was repeated with thawed reconstituted frozen concentrate orange juice and the same analysis was conducted. A commercially available calcium enriched orange juice was similarly analyzed and the results are set forth in Table 4.

TABLE 4

| PRODUCT | BRIX | RATIO | COLOR | OIL | BP | TP | COD | Ca |
|---|---|---|---|---|---|---|---|---|
| Commercial Ca Enriched | 12.71 | 22.29 | 35.5 | 0.014% | 10% | 1.7 | — | 1307 ppm |
| Inventive Ca Enriched | 12.2 | 19.3 | 35.5 | 0.015% | 10% | — | 225 | 1298 ppm |

When orange juice made by this general process was subjected to a taste panel of 48 individuals, 18 individuals preferred the calcium enriched orange juice of the present invention, 15 individuals preferred the commercially available calcium enriched orange juice and 15 individuals had no preference.

Examples 5–8 illustrate large scale techniques illustrating various embodiments of the present invention. Example 5 illustrates the preparation of a calcium enriched frozen orange juice concentrate, Examples 6 and 7 illustrate a not-from-concentrate calcium enriched orange juice beverage and Example 8 illustrates a not-from-concentrate calcium enriched grapefruit juice beverage. In these Examples, the calcium hydroxide, phosphoric acid, tri-calcium phosphate and calcium lactate were obtained from Bell Chem. Corp. of Longwood, Fla.

EXAMPLE 5

In a 250 gallon stainless steel kettle equipped with an agitator, approximately 180 gal of water and 53.54 lbs of calcium hydroxide are added and mixed for at least 10 minutes. To the kettle is then added 64.22 lbs (approx. 4.5 gal) of phosphoric acid and the contents are stirred for approximately 15 minutes until the pH is between 6.00 and 7.00. Calcium lactate in an amount of 83.32 lbs is added to the kettle and mixed for approximately 5 minutes. Tri-calcium phosphate is next added to the kettle in an amount of 95.60 lbs and mixed for at least 10 minutes to obtain complete mixing. A tri-blender can be used to ensure complete mixing.

The resulting slurry is pumped directly to a 1600 gallon stainless steel tank provided with an agitator and containing approximately 927 gallons of orange juice that has been concentrated so as to provide an approximately 7:1 by volume reconstitution ratio. The orange juice concentrate is at a temperature of approximately 2° C. and can contain orange oil and essence complying with Federal Regulations. After the slurry is pumped to the tank containing the orange juice concentrate, approximately 100 gallons of water is added to the kettle, mixed and pumped to the tank containing the mixture of prepared slurry and orange juice concentrate to insure all the calcium is added to the tank. The calcium content is then checked and, if calcium concentration is low, a calcium lactate mixture with water, can be added to the calcium enriched orange juice concentrate. Water is then added to obtain the desired brix within the range of 42.5 to 42.9 as determined by refractometer. In addition, the product has a color on the order of 35.5 and a brix:acid ratio in the range of 14.0: 1 to 20.5: 1. The final product of approximately 1600 gallons is agitated a minimum of 15 minutes before filling containers at a temperature not greater than about 4° C. then flash freezing the containers.

Upon 3:1 volume reconstitution of the orange juice concentrate with water, the orange juice exhibits a brix of approximately 12.2 and provides approximately 30% RDI for calcium per 8 fl. oz. serving (approximately 1270 ppm calcium).

EXAMPLE 6

A 1600 gallon stainless steel tank provided with an agitator is essentially filled with not from concentrate orange juice. Approximately 200 gallons of the not from concentrate orange juice is transferred into a 250 gallon stainless steel kettle equipped with an agitator at a temperature of approximately 4° C. To the kettle is added 13.39 lbs of calcium hydroxide and the contents are mixed for at least 5 minutes. Phosphoric acid in an amount of 25.7 lbs is added to the kettle and the contents mixed for at least 10 minutes until the pH is between 4.0 and 5.0. Calcium lactate in an amount of 20.83 lbs is added to the kettle and the contents mixed for approximately 5 minutes. Calcium tri-phosphate in an amount of 23.90 lbs is next added to the kettle and mixed for about 10 minutes.

The contents of the kettle are pumped back to the 1600 gallon stainless steel tank and mixed for at least 5 minutes. Into the 250 gallon kettle is introduced approximately 200 more gallons of the not-from-concentrate orange juice from the 1600 gallon stainless steel tank, the contents of the kettle are stirred and returned to the 1600 gallon stainless steel tank to ensure that the calcium is homogeneously distributed in the juice in the 1600 gallon stainless steel tank. If desired, orange oil and essence can be added if desired in amounts complying with Federal Regulations.

The calcium enriched orange juice can be filled into retail containers or bulk shipped for later packaging. The calcium enriched orange juice exhibits a brix in the range of from 11.2 to 13.0, a brix:acid ratio of 16.5:1 to 19.5:1 and a color on the order of 37. The calcium enriched orange juice can provide 30% RDI for calcium per 8 fl. oz. serving (approximately 1270 ppm).

EXAMPLE 7

A 1600 gallon stainless steel tank provided with an agitator is essentially filled with not from concentrate orange juice. Approximately 200 gallons of the not from concentrate orange juice is transferred into a 250 gallon stainless steel kettle equipped with an agitator at a temperature of approximately 4° C. To the kettle is added 14.69 lbs of calcium hydroxide and the contents of the kettle are mixed for at least 5 minutes. Phosphoric acid in an amount of 28.2 lbs is added to the kettle and the contents mixed for at least 10 minutes until the pH is between 4.0 and 5.0. Calcium lactate in an amount of 22.83. lbs is then added to the kettle and mixed well for approximately 5 minutes. Tri-calcium phosphate in an amount of 26.17 lbs is next added to the kettle and mixed for about 10 minutes.

The contents of the kettle are pumped back to the 1600 gallon stainless steel tank and agitated for at least 5 minutes. Into the kettle is introduced approximately 200 more gallons of the not-from-concentrate orange juice from the 1600 gallon stainless steel tank, the contents of the kettle are stirred and returned to the 1600 gallon stainless steel tank to ensure that the calcium is homogeneously distributed in the juice in the 1600 gallon stainless steel tank. If desired, oil and ascorbic acid can be added in amounts complying with Federal Regulations.

The calcium enriched orange juice can be filled into retail containers or bulk shipped for later packaging. The calcium enriched orange juice exhibits a brix in the range of from 11.3 to 13.0, a brix:acid ratio of 15.0:1 to 20.5:1 and a color on the order of 35. The calcium enriched orange juice can provide 35% RDI for calcium per 8 fl. oz. serving (approximately 1479 ppm).

EXAMPLE 8

A 1600 gallon stainless steel tank provided with an agitator is essentially filled with not from concentrate grapefruit juice. Approximately 200 gallons of the not from concentrate grapefruit juice is transferred into a 250 gallon stainless steel kettle equipped with an agitator at a temperature of approximately 4° C. To the kettle is added 13.40 lbs of calcium hydroxide and the contents of the kettle are mixed for at least 5 minutes. Phosphoric acid in an amount of 8.0 lbs is added to the kettle and the contents mixed for at least 10 minutes until the pH is between 5.0 and 6.0. Calcium lactate in an amount of 20.85 lbs is then added to the kettle and the contents are mixed well for approximately 5 minutes. Tri-calcium phosphate in an amount of 23.92 lbs is next added to the kettle and mixed for about 10 minutes.

The contents of the kettle are pumped back to the 1600 gallon stainless steel tank and agitated for at least 5 minutes. Into the kettle is introduced approximately 200 more gallons of the not-from concentrate grapefruit juice from the 1600 gallon stainless steel tank, the contents of the kettle are stirred and returned to the 1600 gallon stainless steel tank to ensure that the calcium is homogeneously distributed in the juice in the 1600 gallon stainless steel tank.

The calcium enriched grapefruit juice can be filled into retail containers or bulk shipped for later packaging. The calcium enriched orange juice exhibits a brix in the range of from 9.4 to 12.4, a brix:acid ratio of 10.0:1 to 15.0:1 and a color on the order of 18. The calcium enriched orange juice can provide 30% RDI for calcium per 8 oz. serving (approximately 1270 ppm).

While the invention has been described in detail with reference to preferred embodiments thereof, it will be apparent to one skilled in the art that various changes can be made, and equivalents employed, without departing from the scope of the invention.

What is claimed is:

1. A process for preparing a calcium enriched food product comprising:
    A) forming a mixture of calcium hydroxide and water;
    B) mixing phosphorus-based acid with the mixture, said phosphorus-based acid being in an amount sufficient to substantially neutralize the calcium hydroxide;
    C) mixing calcium lactate with the mixture from step B) until the calcium lactate is dispersed into the mixture;
    D) mixing calcium phosphate with the mixture from step C) until the calcium phosphate is dispersed into the mixture wherein from about 34 to about 48% by weight of total calcium is derived from calcium hydroxide, from about 12 to about 18% by weight of total calcium is derived from calcium lactate and from about 40 to about 48% by weight of total calcium is derived from calcium phosphate; and
    E) mixing the mixture from step D) with beverage material so as to form a calcium enriched food product.

2. The process of claim 1 wherein the calcium hydroxide is mixed with water in an amount of from about 2.6 to about 3.6% weight to volume of the mixture.

3. The process of claim 1 wherein the calcium hydroxide is mixed with water in an amount of from about 3.1 to about 3.3% weight to volume of the mixture.

4. The process of claim 1 wherein the phosphorus-based acid is added in an amount of from about 3.1 to about 4.3% weight to volume.

5. The process of claim 4 wherein the phosphorus-based acid is added in the form of an aqueous solution.

6. The process of claim 1 wherein upon completion of step B), the mixture has a pH of from about 6 to about 7.

7. The process of claim 1 wherein calcium lactate is mixed in the form of powder or granules.

8. The process of claim 1 wherein the calcium phosphate is tri-calcium phosphate.

9. The process of claim 1 wherein upon the completion of step D), the mixture comprises from about 37 to about 43% by weight of total calcium is derived from calcium hydroxide, from about 14 to about 16% by weight of total calcium is derived from calcium lactate and from about 43 to about 47% by weight of total calcium is derived from calcium phosphate.

10. The process of claim 1 wherein upon the completion of step D), the mixture comprises about 40% by weight of total calcium derived from calcium hydroxide, about 15% by weight of total calcium derived from calcium lactate and about 45% by weight of total calcium derived from calcium phosphate.

11. The calcium enriched food product made by the process of claim 10.

12. The process of claim 1 wherein the beverage material is concentrated fruit juice.

13. The process of claim 12 wherein steps A) through E) are conducted in a first container and the mixture from step E) is added to concentrated fruit juice maintained in a second container.

14. The process of claim 13 wherein after the mixture from step E) is added to concentrated fruit juice maintained in the second container, water is added to the first container so as to mix with residual material therein and the mixture is added to the second container.

15. The process of claim 12 wherein after step E), water is added to the calcium enriched food product so as to form a calcium enriched beverage.

16. The process of claim 15 wherein the amount of water is sufficient to reconstitute the fruit juice to a Brix value substantially the same as not from concentrate fruit juice.

17. The process of claim 15 wherein the fruit juice is orange juice, grapefruit juice or mixtures thereof.

18. The calcium enriched food product made by the process of claim 17.

19. The calcium enriched food product of claim 18 wherein the beverage has a calcium content so as to provide from about 10 to about 40% of the RDI for calcium per 8 oz. serving.

20. The calcium enriched food product made by the process of claim 15.

21. The process of claim 1 wherein the temperature of steps A) through D) is from about 20 to about 35° C.

22. The process of claim 1 wherein the temperature of step E) is from about 2 to about 10° C.

23. The process of claim 1 wherein the phosphorus-based acid is phosphoric acid.

24. The process of claim 1 wherein the fruit juice is orange juice, grapefruit juice or a mixture thereof.

25. The calcium enriched food product made by the process of claim 1.

26. A process for preparing a calcium enriched food product comprising:
   A) forming a mixture of calcium hydroxide and fruit juice;
   B) mixing phosphorus-based acid with the mixture, said phosphorus-based acid being in an amount to obtain a pH in the range of from about 4.0 to about 6.0;
   C) mixing calcium lactate with the mixture from step B) until the calcium lactate is dispersed into the mixture; and
   D) mixing calcium phosphate with the mixture from step C) until the calcium phosphate is dispersed into the mixture so as to form a calcium enriched food product wherein from about 34 to about 48% by weight of total calcium is derived from calcium hydroxide, from about 12 to about 18% by weight of total calcium is derived from calcium lactate and from about 40 to about 48% by weight of total calcium is derived from calcium phosphate.

27. The process of claim 26 wherein the fruit juice is orange juice.

28. The process of claim 27 wherein the orange juice is not-from-concentrate orange juice.

29. The process of claim 26 wherein the calcium hydroxide is mixed with the fruit juice so as to be present in an amount of from about 0.6 to about 1.0% weight to volume of the mixture.

30. The process of claim 26 wherein the calcium hydroxide is mixed with the fruit juice so as to be present in an amount of from about 0.8 to about 0.9% weight to volume of the mixture.

31. The process of claim 26 wherein the fruit juice is orange juice and the phosphorus-based acid is added in an amount to obtain a pH in the range of from about 4.0 to about 5.0.

32. The process of claim 31 Wherein upon completion of step B), the mixture has a pH of about 4.2.

33. The process of claim 26 wherein the fruit juice is grapefruit juice and the phosphorus-based acid is added in an amount to obtain a pH in the range of from about 5.0 to about 6.0.

34. The process of claim 26 wherein calcium lactate is mixed in the form of powder or granules.

35. The process of claim 26 wherein the phosphorus-based acid is phosphoric acid.

36. The process of claim 67 wherein the calcium phosphate is tri-calcium phosphate.

37. The process of claim 26 wherein upon the completion of step D), the mixture comprises from about 37 to about 43% by weight of total calcium is derived from calcium hydroxide, from about 14 to about 16% by weight of total calcium is derived from calcium lactate and from about 43 to about 47% by weight of total calcium is derived from calcium phosphate.

38. The process of claim 26 wherein upon the completion of step D), the mixture comprises about 40% by weight of total calcium derived from calcium hydroxide, about 15% by weight of total calcium derived from calcium lactate and about 45% by weight of total calcium derived from calcium phosphate.

39. The calcium enriched food product of claim 38.

40. The calcium enriched food product made by the process of claim 26.

41. The calcium enriched food product of claim 40 wherein the beverage has a calcium content so as to provide from about 10 to about 40% of the RDI for calcium per 8 oz. serving.

* * * * *